UNITED STATES PATENT OFFICE.

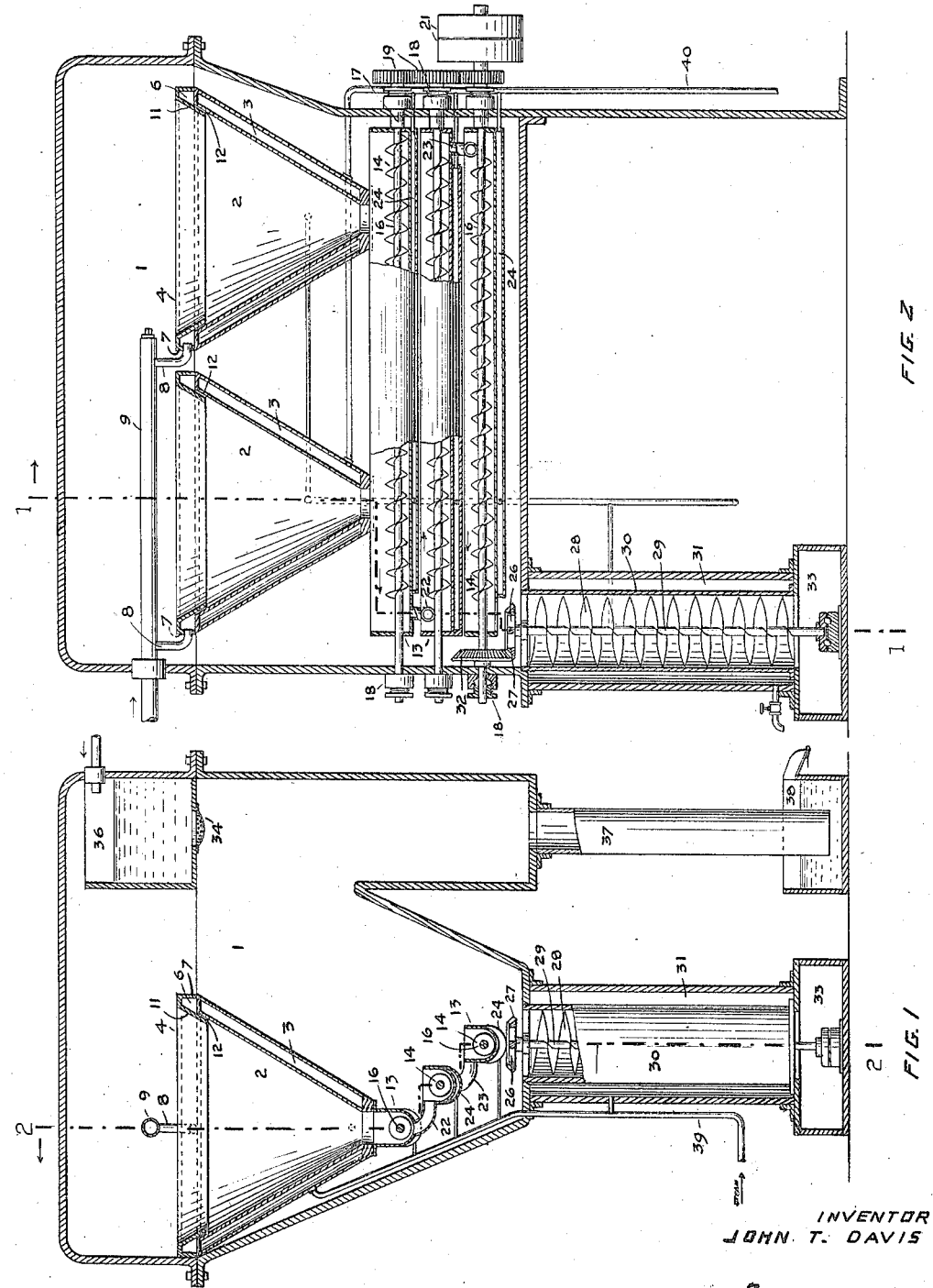

JOHN T. DAVIS, OF ALAMEDA, CALIFORNIA.

APPARATUS FOR EVAPORATING SUGAR AND THE LIKE.

1,263,747.    Specification of Letters Patent.    Patented Apr. 23, 1918.

Application filed July 11, 1916. Serial No. 108,564.

*To all whom it may concern:*

Be it known that I, JOHN T. DAVIS, a citizen of the United States, residing at Alameda, in the county of Alameda and State of California, have invented new and useful Improvements in Apparatus for Evaporating Sugar and the like, of which the following is a specification.

The present invention relates to an apparatus for evaporating, and especially for evaporating sugar solution.

An objection to the system of evaporating by vacuum pans is that the quantity of sugar in the solution is constantly changing, the effect of which is to correspondingly vary the rate of evaporation and other conditions of treatment. One object of the present invention is to provide an apparatus by means of which the rate of supply of sugar solution will be uniform, as will also be the supply of heat, whereby the rate of evaporation of the sugar solution will also be uniform, and the process can be carried on continuously under absolutely uniform conditions.

A further object of the invention is to so evaporate the solution as to avoid injury by heat to the solid contents, such as sugar in a sugar solution or the casein of milk, such injury consisting of imparting a burnt flavor to the milk or color to the sugar.

A further object is to provide an apparatus whereby the heat necessary to produce the evaporation will be applied to a small body of the liquid for a short time only, and after said body has been sufficiently evaporated it will be immediately removed from the influence of the heat, as contrasted with prior methods in which it has been found necessary to apply heat for a long period to a large body of liquid. It has been found that such long continued heat was a serious detriment to the crystallizing property of the sugar. But the only remedy that has heretofore been devised has been to lower the temperature of the applied heat by the provision of the vacuum pan. While this was a valuable improvement it remedied the evil only to a limited extent. My invention, on the other hand, contemplates the exposure of the solid contents to a heated surface for a short period only. I accomplish this object by causing the liquid to flow automatically in a thin film over a surface sufficiently heated to just evaporate the water without unduly heating the solids, and I also provide means for immediately removing the vapor from the residual liquid.

A further object of the invention is to provide an apparatus by means of which the sugar solution, when it is beginning to be in a condition for crystallization, will be constantly agitated, while being further evaporated, whereby the crystals that are formed will increase in size by aggregation.

In the accompanying drawing, Figure 1 is a transverse section on the line 1—1 of Fig. 2; Fig. 2 is a longitudinal section on the line 2—2 of Fig. 1.

Referring to the drawing, 1 indicates a vapor chamber in which are suitably supported inverted conical plates 2, here shown as two in number, said plates forming the inner and upper surfaces of conical steam chambers 3. The top circular walls 4 of said steam chambers form the bottoms of circular solution chambers 6, through the outer walls 7 of which sugar solution, or other liquid to be evaporated, is fed by branch pipes 8 from a main supply pipe 9. The inner wall 11 of each sugar solution chamber is conical and approaches very closely to the upper surface of the corresponding conical plate 2, so that the sugar solution can escape through the very narrow opening 12, about one-sixteenth of an inch in width, between said wall 11 and the plate 2. The sugar solution flowing in a thin film on the conical plates 2, which are heated by the steam in the steam chambers 3, parts with its vapor, until, when arriving at the bottom of the conical plate, it is of a gravity of about 33° Baumé. The sugar solution then falls into the uppermost of a vertical series of troughs 13, in which there are longitudinal screw conveyers 14, on shafts 16, rotating in bearings 17, and passing through stuffing boxes 18, and carrying on their ends, extending through one end of the vapor chamber, gear wheels 19 meshing with each other. The lowermost shaft carries fast and loose pulleys 21, by the former of which all of said shafts can be rotated.

The liquid sugar falling into the uppermost of the troughs 13 is moved longitudinally by the screw conveyer 14 therein until it reaches one end thereof when it drops by a pipe 22 into the next lower trough, and is then moved by the screw conveyer in said trough in the opposite direction, and then falls through a pipe 23 into a lower trough and is again moved in the opposite direction by the screw conveyer therein. When moving in each of these troughs the sugar solution is heated by a steam jacket 24 surrounding the bottom and part of the sides of the trough. The vapor, generated from the sugar solution by the heat of the steam, rises from the troughs and the sugar solution becomes more and more concentrated. When it arrives at the discharge end of the lowermost trough, it falls through openings 26 in a gear wheel 27 on to a vertical screw conveyer 28 on a shaft 29, rotatable in a vertical delivery tube 30, surrounded by a steam jacket 31, said gear wheel meshing with a gear wheel 32 on the lowermost screw conveyer shaft 14. By means of said vertical screw conveyer 28, it is conveyed into a chamber 33, from which it can be removed from time to time as required. So much of the vapor has been evaporated from the sugar solution that it is now ready for crystallization.

The vapor rising from the conical plates 2, from the troughs 13 and from the vertical tube 30 is condensed by means of a water spray supplied from a spraying device 34 located in the bottom of a water receptacle 36, said water spray, and the water condensed from the vapor, falling down a vertical pipe 37 provided at the bottom with a liquid seal 38. The condensation of the vapor by means of the water spray produces a vacuum in the upper part of the vacuum chamber, thus causing the vapor to flow quickly from the place where it is generated, so that fresh vapor may be formed thereat. 39 indicates a pipe for supplying steam to the steam jackets, and 40 a pipe for drawing off the water condensed therefrom.

It is to be observed that, if a suction pump be employed to produce a vacuum in the vapor chamber, then the delivery tube need only extend but a few feet below the lowermost trough, but if the operation is conducted without the pump, then the delivery tube should be thirty-four feet long and extend to the level of the water seal, so that the delivery tube and water pipe may have the same barometric pressure, the stirring apparatus extending to the bottom of the delivery tube.

I claim:—

1. In an evaporator, a conical plate, a chamber below said plate and of which the plate forms the upper side, means for supplying steam to said chamber, and an annular chamber on the top of said conical plate for containing the liquid to be evaporated and having a wall extending adjacent to said conical plate to form therewith a narrow annular outlet for said liquid.

2. In an evaporator, the combination of a vapor chamber, a conical plate therein, a steam chamber immediately beneath said plate, and of which said plate forms the upper side, an annular chamber located at the top of said conical plate for containing the liquid to be evaporated, and having a discharge outlet for discharging the liquid on the top of said plate, a trough into which the liquid is discharged from said conical plate, a conveyer in said trough, a steam chamber on the under side of said trough, and means for supplying steam to said steam chambers.

3. In an evaporator, the combination of a vapor chamber, a conical plate therein, a steam chamber immediately beneath said plate, and of which said plate forms the upper side, an annular chamber located at the top of said conical plate for containing the liquid to be evaporated and having a discharge outlet for discharging the liquid on the top of said plate, a trough into which the liquid is discharged from said conical plate, a conveyer in said trough, a steam chamber on the under side of said trough, means for supplying steam to said steam chambers, and means for constantly removing the vapor generated.

4. In an evaporator, the combination of a vapor chamber, a conical plate therein, a steam chamber immediately beneath said plate, and of which said plate forms the upper side, an annular chamber located at the top of said conical plate for containing the liquid to be evaporated and having a discharge outlet for discharging the liquid on the top of said plate, a trough into which the liquid is discharged from said conical plate, a conveyer in said trough, a steam chamber on the under side of said trough, means for supplying steam to said steam chambers, and a water spray for continuously condensing the vapor generated.

5. In an evaporator, the combination of a vapor chamber, a conical plate therein, a steam chamber immediately beneath said plate, and of which said plate forms the upper side, an annular chamber located at the top of said conical plate for containing the liquid to be evaporated and having a discharge outlet for discharging the liquid on the top of said plate, a trough into which the liquid is discharged from said conical plate, a conveyer in said trough, a steam chamber on the under side of said trough, means for supplying steam to said steam chambers, a water spray for continuously condensing the vapor generated, a tube through which the spray water and condensed water fall, and a water seal at the bottom of said tube.

6. In an evaporator, the combination of a vapor chamber, a conical plate therein, a steam chamber immediately beneath said plate, and of which said plate forms the upper side, an annular chamber located at the top of said conical plate for containing the liquid to be evaporated, and having a discharge outlet for discharging the liquid on the top of said plate, a trough into which the liquid is discharged from said conical plate, a conveyer in said trough, a steam chamber on the under side of said trough, a vertical tube, a conveyer therein on to which the material conveyed by the first conveyer drops, a steam chamber around said tube, and means for operating said conveyers simultaneously, and means for supplying steam to said steam chambers.

JOHN T. DAVIS.

Copies of this patent may be obtained for five cents each, by addressing the "Commissioner of Patents, Washington, D. C."